United States Patent [19]

Zoller

[11] Patent Number: 5,268,053
[45] Date of Patent: Dec. 7, 1993

[54] PLASTIC HEAT SET MOLDING

[75] Inventor: Robert A. Zoller, Bay Village, Ohio

[73] Assignee: The Standard Products Company, Cleveland, Ohio

[21] Appl. No.: 750,885

[22] Filed: Aug. 26, 1991

Related U.S. Application Data

[63] Continuation-in-part of Ser. No. 619,126, Nov. 28, 1990.

[51] Int. Cl.⁵ .............................................. B29C 45/16
[52] U.S. Cl. .................................... 156/242; 156/245; 264/328.1; 428/31
[58] Field of Search .............. 156/242, 245, 155, 77, 156/78, 79; 428/31; 264/46.4, 259, 328.1

[56] References Cited

U.S. PATENT DOCUMENTS

| | | | |
|---|---|---|---|
| 3,837,984 | 9/1974 | Wagner et al. | 428/31 |
| 4,101,698 | 7/1978 | Dunning et al. | 428/31 |
| 4,138,283 | 2/1979 | Hanusa | 156/245 |
| 4,244,764 | 1/1981 | Ginsburg | 156/245 |
| 4,360,549 | 11/1982 | Ozawa et al. | 428/31 |
| 4,369,608 | 1/1983 | Miura et al. | 52/309.9 |
| 4,451,518 | 5/1984 | Miura et al. | 428/137 |
| 4,498,697 | 2/1985 | McGlone et al. | 293/128 |
| 4,564,021 | 10/1985 | Mears | 156/92 |
| 4,566,929 | 1/1986 | Waugh | 156/242 |
| 4,569,880 | 2/1986 | Nishiyama et al. | 428/212 |
| 4,668,543 | 5/1987 | Schlenz | 428/31 |
| 4,671,974 | 6/1987 | Murachi | 428/31 |
| 4,695,501 | 9/1987 | Robinson | 428/159 |
| 4,708,894 | 11/1987 | Mabuchi et al. | 428/31 |
| 4,873,045 | 10/1989 | Fujita et al. | 264/259 |
| 4,911,959 | 3/1990 | Miyakawa | 428/31 |
| 4,973,371 | 11/1990 | Parker | 156/245 |

Primary Examiner—Caleb Weston
Attorney, Agent, or Firm—Harness, Dickey & Pierce

[57] ABSTRACT

An apparatus and method of manufacturing a trim strip with an outer heat settable molding bonded to a base with an adhesive attaching member. The method includes heating a liquid heat settable material to be bonded to a hard base with an adhesive member at very low pressures to form a trim strip. The trim strip includes a hollow cavity which is injected with liquid foam to provide a foam core.

16 Claims, 3 Drawing Sheets

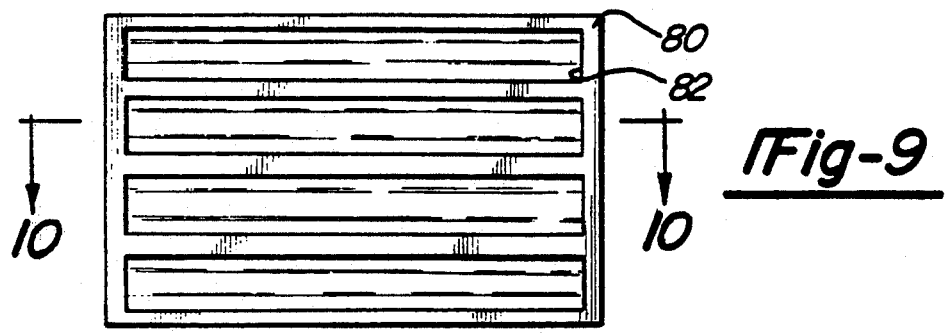
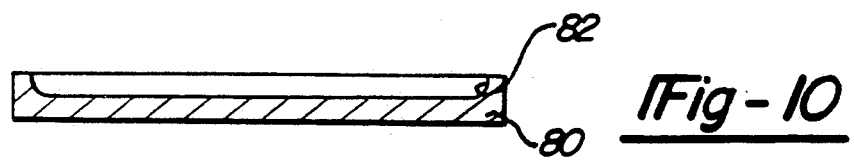
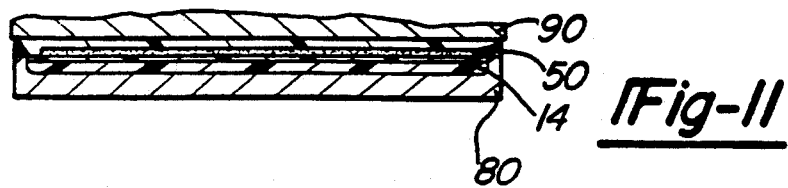

PLASTIC HEAT SET MOLDING

RELATED APPLICATION

This is a continuation-in-part application of U.S. application Ser. No. 07/619,126, filed Nov. 28, 1990, entitled "Plastic Heat Set Molding", the specification of which is expressly incorporated by reference.

BACKGROUND OF THE INVENTION

The present invention relates to trim strips or molding and, more particularly, to a trim strip or molding manufactured from an injection process or extruding with a post form process.

In commonly known injection molding operations, generally the molds or dies utilized in the operation are very heavy, sturdy and durable. This is due to the fact that the material injected into the molds or dies is at elevated temperature and pressure. Thus, the molds must be very strong and durable to endure the increased temperature and pressure which also explains their high cost.

During the manufacturing of trim strips or molding, especially trim strips for vehicles, which utilize adhesive strips to position the trim strips onto the vehicle, a primer or barrier must be positioned between the outer plastic molding and the adhesive tape. The barrier is needed to prevent eventual migration of plasticizer from the molding to the adhesive tape which would, in time, destroy the bond of the adhesive tape to the molding. Thus, a very thin film of aluminum or the like including chemical barrier coatings have been utilized to prevent migration of plasticizer to the adhesive tape.

Another problem associated with trim strips which have been extruded or injection molded is known as metallic flop. Metallic flop is a phenomena which occurs during the extrusion or injection molding process which provides the trim strip with unidirectional characteristics. That is, the trim strip may only be positioned onto a surface in one direction to provide desired color characteristics. If the trim strip is applied to the vehicle in a reverse direction, the color characteristics of the material are different, e.g., the color of the strip does not match the color of the surface, indicating that the material has been flopped. Particularly, if two parts are laid side by side in the same orientation which they came out of a mold or extruder, that is their forward ends are positioned side by side and their rearward ends are positioned side by side, there would be no apparent difference in color between the two. However, if one of the strips were to be flipped such that the rearward end of one strip was positioned side by side the forward end of the other strip there would be a noticeable difference in color between the two parts. This is known as metallic flop. To alleviate the metallic flop problem, the trim strips are marked as they leave the factory to indicate which direction they should be applied onto the surface.

Another problem existing in current trim strip manufacturing is that with respect to coloring the trim strip. Since the color formulation of the plastic to manufacture the trim strip is ordinarily color checked in small quantities in a research laboratory by a researcher utilizing different apparatus than is utilized in the production of the trim strips, there sometimes is a difference in color. This coloring difference is generally due to the fact that the apparatus or machinery used to produce the color of the plastic of the trim strip in the laboratory is different than the machinery utilized for mass production of trim strips. Thus, once production trim strips are manufactured, if the color does not match the vehicle color, the color formulation of the trim strip must be modified so that the production machinery will produce the desired color appearance.

Trim strips made with current injection molding processes, with hollowed out portions on the underside that are irregular in position, are difficult to make. "Sinks" appear on the top finished surface in the areas where the cross section thickness undergoes a considerable change. These "sinks" degrade the appearance of the finished part surface.

Current trim strips are molded or shaped and then undergo additional processing to apply the adhesive tape and then trim the tape. These operations add to the total manufacturing cost of the molding.

Thus, it is desirous to have trim strips and a method of manufacturing trim strips which overcome the above disadvantages. Accordingly, the present invention provides the art with a trim strip which overcomes the above disadvantages.

The present invention provides the art with a trim strip which is manufactured by a molding process. The molding occurs at very low pressure, if any, to enable utilization of low cost lightweight molds or dies. The trim strip or molding is formed by dispensing liquid plastic into a mold and applying heat to solidify the plastic. Adhesive tape is applied to a hard plastic strip to form a separate laminate, and this laminate is bonded to the solidified plastic soon after completion of the heating cycle. Alternatively the liquid plastic could be solidified and, after cooling, adhesive tape along with a barrier applied thereto. The hard plastic strip effectively acts as a barrier and prevents plasticizer from migrating from the solidified plastic which in time would destroy the bond between the adhesive tape and the solidified plastic. Plastics that can be used in this invention may be liquid vinyls such as plastisols. The hard plastic strip may be vinyl made in conventional extruding or calandering methods. The above tape processing steps are much less costly than those used on current moldings. The present invention, which is molded at very low pressure, produces trim strips which are color nondirectional and substantially eliminate metallic flop.

Also, on account of the low pressure, trim strips with large abrupt changes in thickness may be manufactured without "sinks" on the finished surface. This characteristic is becoming more important due to the trend of new designs requiring high gloss smooth surfaces on new automotive applications where sinks are more noticeable. It is also important for the new designs to incorporate weight saving features which can be achieved by hollowing out bottom portions of the trim strip.

This molding process also exhibits advantageous surface adherence capability when the molding is finally attached to a surface. A suitable tension force may be applied to the adhesive tape when the laminate is manufactured so that the completed molding is either straight or lengthwise curved so that the taped surface is lengthwise concaved.

From the subsequent detailed description taken in conjunction with the accompanying claims and subjoined drawings, other objects and advantages of the present invention will become apparent to those skilled in the art.

BRIEF DESCRIPTION OF THE DRAWINGS

FIG. 8 is a plan view of FIG. 7 of the upper plate along line 8—8 thereof.

FIG. 9 is a plan view of a mold in accordance with the present invention taken along line 9—9 thereof.

FIG. 10 is a sectional view of the mold of FIG. 9 taken along line 10—10 thereof.

FIG. 11 is a sectional view taken when the cover plate is covering the mold.

DETAILED DESCRIPTION OF THE PREFERRED EMBODIMENT

Figure 1:
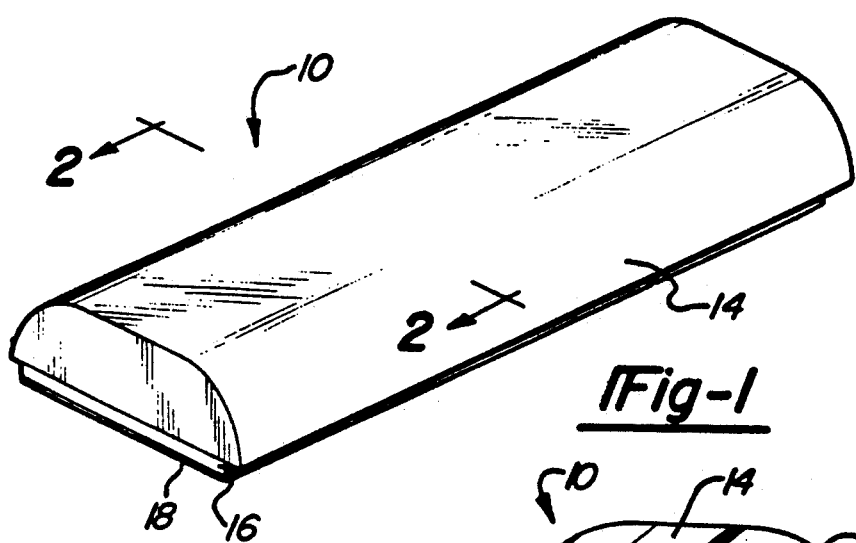
FIG. 1 is a perspective view of a trim strip in accordance with the present invention.

Turning to the figures, particularly FIGS. 1-4, a trim strip is illustrated in accordance with the present invention. The trim strip 10 is an elongated member including a base 12, outer molding 14 and adhesive tape member 16.

The base 12 is generally an elongated flat planar strip. The strip may be extruded or provided from a roll of stock material as will be discussed herein. Generally the base 12 is a film of polyvinyl chloride material having a thickness of about 0.04 inch. Preferably, the base 12 is relatively hard or stiff and provides rigidity to the trim strip 10. Also, because the base has very little, if any plasticizer, it acts as a barrier to prevent the migration of plasticizer from the solidified plastic outer molding 14 to the adhesive tape. As previously mentioned, this migration tends to destroy the bonding capability of the adhesive tape. Other plastic materials may be used as a base, including thin metals primed to facilitate bonding to the solidified plastic.

The adhesive tape member 16 is generally of the two faced adhesive tape type. The tape may have substantially minimal thickness or it may be of the foam type. Generally a release layer 18 is on the outside of the adhesive member 16 which is removed upon positioning the trim strip 10 onto a surface.

Figure 2:
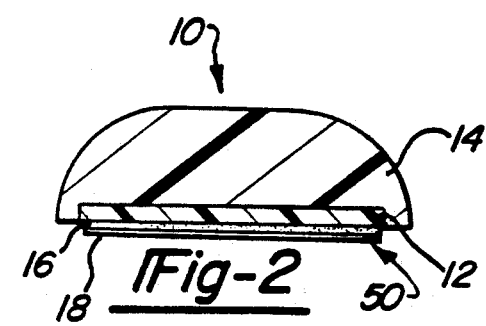
FIG. 2 is a sectional view of FIG. 1 through line 2—2 thereof.

The outer molding 14 is made from a liquid vinyl chloride resin elastomer material which is generally known as plastisol. Plastisol is available in a number of colors to enable the trim strip to be colored to a manufacturer's specifications. The outer molding may be directly bonded to the base 12 as shown in FIG. 2.

Figure 3:
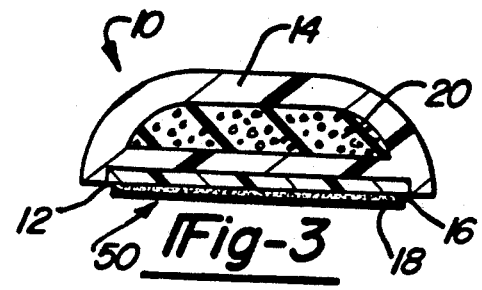
FIG. 3 is a sectional view like FIG. 2 of an alternate embodiment of the present invention.

FIG. 3 illustrates the trim strip where a non-woven or foam material core 20 is positioned beneath the outer shell 14. As an option, the core 20 may be positioned directly onto the base 12 prior to forming of the trim strip 10. The core 20 is lightweight and inexpensive reducing the cost and weight of the trim strip 10. Also, a core may be utilized which would disintegrate during manufacturing of the trim strip to provide a hollow cavity 22 like that illustrated in FIG. 4. The hollow cavity 22 may be produced by a removable insert during the molding process as will be explained herein.

Figure 4A:
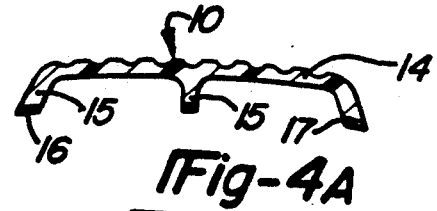
FIG. 4A is a sectional view of an alternate embodiment of the present invention.
Figure 4:
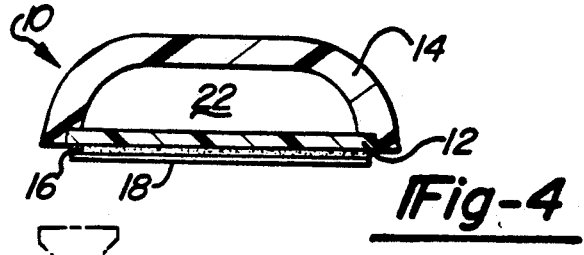
FIG. 4 is a sectional view like FIG. 2 of another alternate embodiment of the present invention.

FIG. 4A illustrates another embodiment of the present invention. Here the trim strip 10 is shown with a wide outer shell. The adhesive member 16 could be added to the support legs 15 with the addition of a barrier layer 17 or the hard base 12. The trim strip could also be secured by a mechanical mechanism. The trim strip is concavely curved in cross section to follow the contour to which it is to be secured.

Figure 4B:
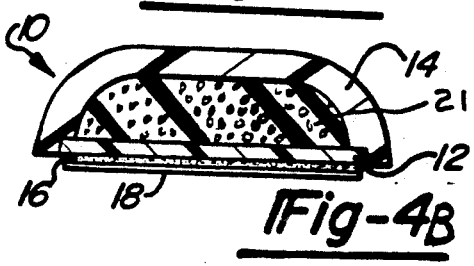
FIG. 4B is a sectional view of an alternate embodiment of the present invention.

FIG. 4B illustrates another embodiment of the present invention. Here the trim strip 10 is like that shown in FIG. 4. The trim strip includes a base 12, outer molding 14 and adhesive tape member 16 with a release layer 18. Also, the trim strip is formed with a hollow cavity. After forming, liquid foam is injected into the hollow cavity to provide a foam core 21 within the cavity as illustrated in FIG. 4B.

Figure 5:
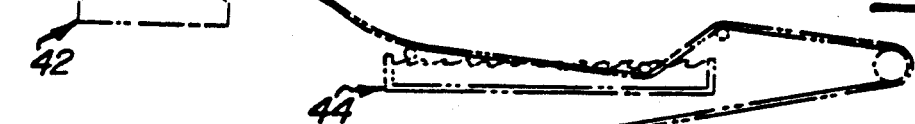
FIG. 5 is a schematic view of an apparatus for manufacturing a backing material laminate in accordance with the present invention.

Turning to FIGS. 5-11, a better understanding of the method of manufacturing the trim strip in accordance with the present invention will be understood. FIG. 5 schematically illustrates a method of manufacturing the backing member 24 which is comprised of the base 12 and adhesive member 16.

The base member 12 may be purchased in a coil 30 cut to a desired width and at a desired thickness. The coil 30 of base material is positioned onto an unwind stand. Likewise, the adhesive tape member 16, of a desired width, may be purchased in a coil 32 and placed onto an unwind stand. The base material 12 and adhesive tape member 16 are unwound from their stands by driven pull rollers 34 and 36. The rollers 34 and 36 unwind the coils 30 and 32 while bonding the adhesive member 16 to the base member 12. The driven rollers 34 and 36 drive the composite backing material 24 towards a blanking die 38. Also, mechanism roller 35 applies a liquid chemical primer to the hard base material 12 to enhance the bond strength to the molding 14.

A measuring device 40 measures the backing material 24 as it enters into the blanking die 38 to provide desired lengths of the backing material 24. Once in the blanking die 38, the backing material 24 is cut to its desired length and shape to be applied into a mold. In an alternate embodiment, an extruder 42 may directly extrude the base member 12 and move the base member through a cooling water tank 44 around a series of rollers into drive rollers 34 and 36 as illustrated in phantom in FIG. 5. The base 12 is then contacted with the adhesive 16 to form the backing material 24. With the backing members 50 cut to size and shape, the backing members 50 are ready to be joined with the outer shell 14 to form the trim strip 10.

Figure 6:
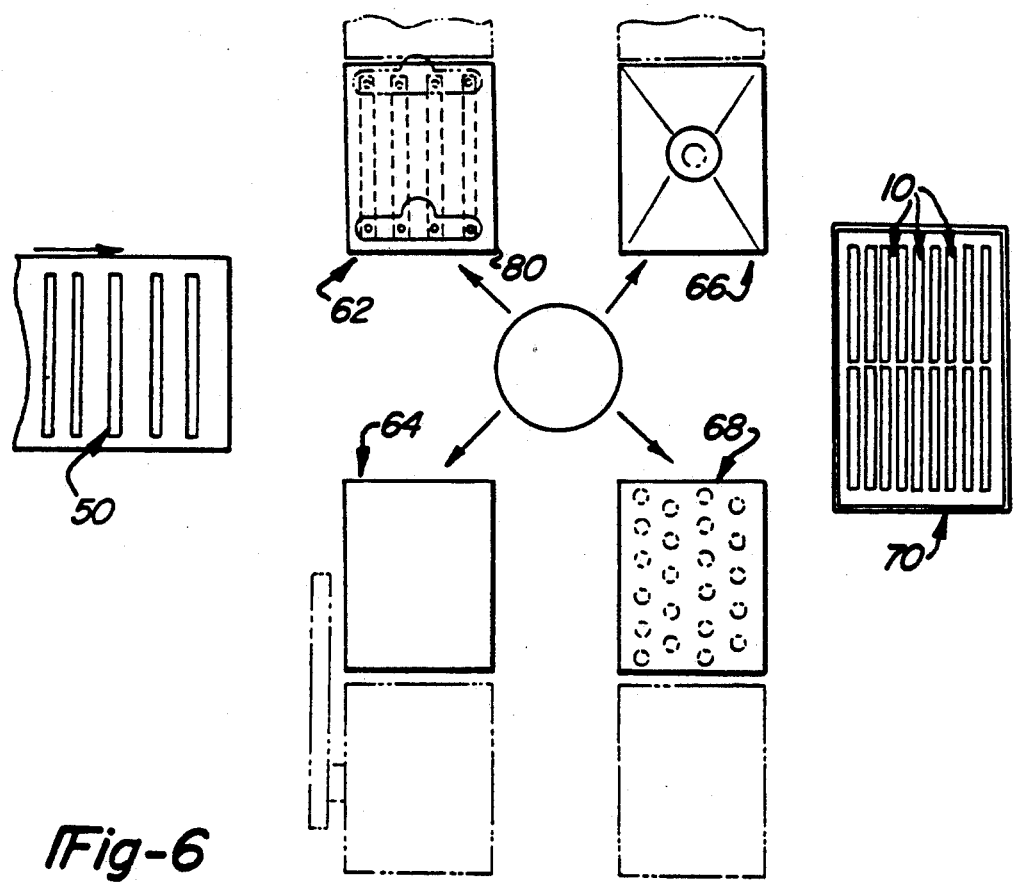
FIG. 6 is a schematic view of a station layout for manufacturing trim strips of the present invention.
Figure 7:
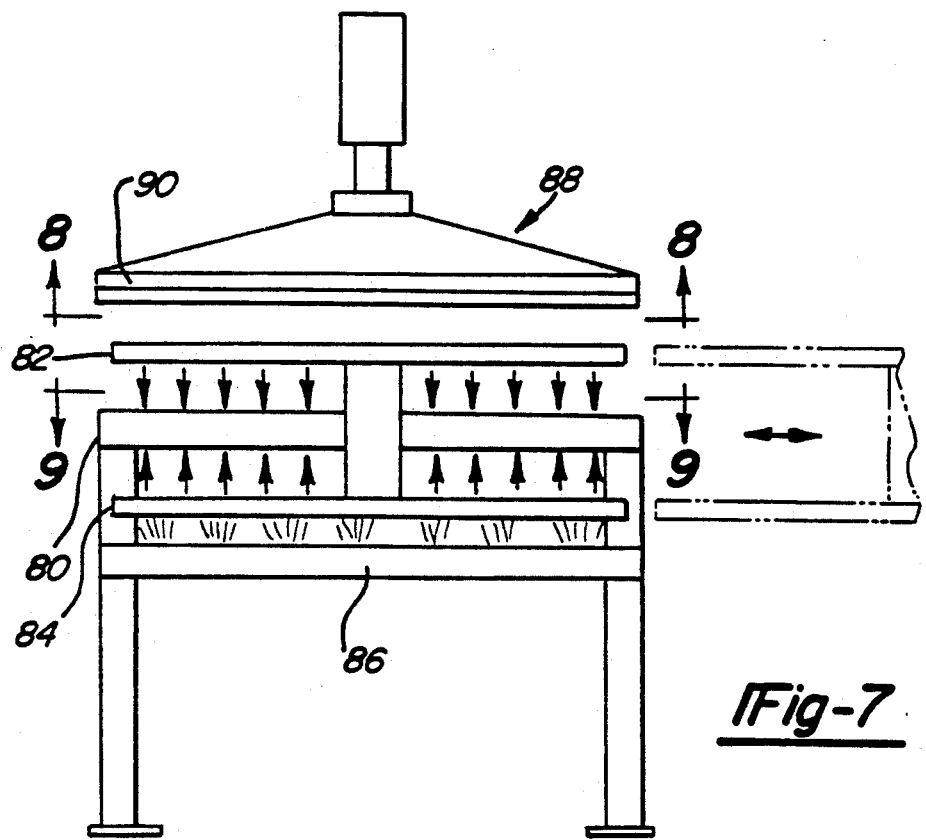
FIG. 7 is a schematic view of a molding apparatus for manufacturing trim strips in accordance with the present invention.

FIGS. 6 and 7 illustrate molding apparatus for manufacturing the trim strip 10. FIG. 6 shows a layout for mold stations 62, 64, 66, and 68 where an operator would receive a supply of backing members 50 to position them in molds as will be explained with respect to FIG. 7. In FIG. 6, the mold station 62 is shown with a pouring apparatus, mold station 64 is shown in the heating mode, mold station 66 is shown in the covered position, and mold station 68 is shown in the cooling mode. Once the trim strips 10 are formed, the operator would place the finished trim strips into a receiving container 70.

The mold stations 62, 64, 66 and 68 which are substantially identical are best illustrated in FIG. 7. Each mold station includes a lightweight mold 80, movable heaters 82 and 84, cooling spray nozzle 86 and cover assembly 88. The mold 80 as best seen in FIGS. 9 and 10 is stationarily positioned on the apparatus so that the mold 80 is substantially level with respect to horizontal. This enables the liquid plastisol to be poured into the mold 80 and seep its own level to be substantially level in the mold cavities. The mold 80 generally has four cavities, however, a number of different cavities could be provided.

Liquid plastisol is poured into the mold cavities and is heated to a temperature to form the plastisol to a solid elastomeric mass while the mold is open or uncovered. Generally, a temperature of approximately 170° Celsius will form the plastisol material into a solid mass. The heating process generally takes up to 4 minutes depending on molding size. As the heating occurs, the plastisol begins to solidify into a solid mass.

After the cycle for the top heater 82 is completed and heater withdrawn, the cover assembly 88 is lowered onto the mold 80. The cover assembly 88 which includes cover plate 90, holds a corresponding number of backing member 50 therein. As best illustrated in FIG. 8, the plate 90 includes a resilient heat resistant layer, preferably silicone rubber, having a series of holding pockets 92 to receive the backing members 50. The pockets 92 may include a vacuum assist to hold the backing members 50 into the pockets 92. The plate 90 is aligned with the mold 80 such that the backing members 50 are positioned to mate with the cavities 82 to form the trim strip 10. At the end of the heating cycle, the plate 90 is lowered onto the mold 80 such that the base member 12 of backing member 50 contacts the heated solid plastisol within the mold cavities 82 as illustrated in FIG. 11. This contacting enables the backing members 50 to bond to the outer molding 14 forming an integral trim strip. Also, the base 12 prevents migration of the plasticizer to maintain the adhesive tape 16 intact as explained above. After the backing members 50 have been in contact with the outer molding 14 for a desired period of time, the water spray nozzles 86 are activated to cool the mold 80. Upon cooling, the trim strips 10 are formed and removed from the mold 80. Since the heating and cooling steps take place at substantially zero pressure, the trim strips do not encounter the sink problem. Likewise, the molds and water spray nozzles may be movable and the heaters stationary. Thus, depending upon the design of the apparatus, a majority of the components may be movable to accomplish the manufacturing of the trim strip.

In the case where a trim strip is manufactured like that illustrated in FIG. 3, the foam core 20 would be cut to the required length and shape, secured onto a positioning fixture and placed into the open mold after the required amount of plastisol has been poured into the mold. This sequence allows the plastisol to form around the foam prior to the heating cycle. After the heating cycle is completed the foam positioning fixture is removed and the backing member 50 laminate is added to and bonds to the solid heated plastisol. In the case where the material is disintegratable, a similar process would be conducted, however, during heating upon disintegration of the foam, a cavity would form between 12 and the heat settable outer plastic shell 14, like that of FIG. 4. Also, to form a hollow cavity in the trim strip, a removable insert may be inserted into the heat settable material. This would be accomplished by allowing the heat settable material to form about the insert. After the heating step, however, the insert would be removed followed by the addition of the backing member 50 to the outer shell. The removal of the insert followed by the addition of backing member 50 would form a cavity within the trim strip to provide a hollow cavity trim strip like that of FIG. 4. Also, the liquid plastisol may be heated and cooled and include a removable insert, as explained above, then covered with a barrier layer and an adhesive member added to form a trim strip.

The heat settable outer shell may be manufactured in a plurality of different colors. Generally a color paste is added to the heat settable material providing the desired color of the trim strip. The liquid plastic with the color paste added to it is converted to a finished molding color on the production floor simply by adding heat. This is the same thing that is done in the laboratory for checking the color match. Because of this simple process of adding heat, the subject invention has two color advantages over current production extruding and injection molding processes. First, initial color formulation to a color master is done much faster because only one simple step is needed, the addition of heat, to convert a color blended material to a final processed state. Color formulation in present extruding and injection molding processes requires more complex equipment in the laboratory and the production floor such as heated roll mills, blenders, extruders and injection molding machines (with their own variables—screw designs, speeds, outputs, etc.). All of these items also involve the human element which, in turn, tends to vary the color. Second, day-to-day consistency of color match from laboratory and color blending to the production floor is better than current processes due to the simple process of adding heat to the color-blended liquid plastic.

Once the heat settable material is poured into the mold 80, a core or a hollow cavity may be utilized during the process to form a low cost lighter weight trim strip. Since little or substantially no pressure is utilized during the molding operation, the tooling cost of the mold or die is substantially reduced. Also, the molding process inherently forms trim strips which are color multi-directional. Thus, the trim strip may be manufactured from a molding operation without utilizing high pressures commonly encountered during conventional injection molding.

While the above detailed description describes the preferred embodiment of the present invention, it will be understood that the present invention is susceptible to modifications, variations, and alterations without deviating from the scope and spirit of the subjoined claims.

What is claimed is:

1. A method of manufacturing a trim strip during a low pressure molding process comprising:
   providing a mold;
   adding a desired amount of a heat settable material into said mold;
   heating said mold containing said desired amount of heat settable material;
   applying a backing means, for preventing the migration of plasticizer, to said heat settable material;
   bonding said backing means to said heat settable material;

forming a hollow cavity between said heat settable material and said backing means;

forming a trim strip at a low pressure with said hollow cavity from said heat settable material and backing means;

removing said trim strip from said mold; and injecting liquid foam into said trim strip hollow cavity.

2. The method according to claim 1 further providing said backing means including a barrier member and an adhesive means for attaching the trip strip to a surface.

3. The method according to claim 2 wherein said barrier member is a substantially hard or stiff strip material.

4. The method according to claim 1 further comprising cooling said trim strip prior to removal from said mold.

5. The method according to claim 1 further comprising positioning a heated or non heated removable insert in said heat settable material during heating to enable said heat settable material to form about said insert, removing said insert from said heat settable material to form said trim strip with said hollow cavity.

6. The method according to claim 1 further comprising cutting said backing means to a desired size to substantially cover said heat settable material prior to applying said backing means to said heat settable material.

7. The method according to claim 1 further comprising stationarily positioning said mold to provide said mold with a level horizontal position.

8. The method according to claim 7 further comprising movably positioning a heating source about said mold and removing said heating source after heating of said mold.

9. The method according to claim 8 further comprising stationarily positioning a cooling means with respect to said mold for cooling said mold after heating.

10. The method according to claim 9 wherein said cooling means is of the water spray type.

11. The method according to claim 1 further comprising moving said mold from station to station during said method.

12. The method according to claim 1 further providing a cover assembly including a plate member, said plate member having a resilient heat resistant cover with at least one pocket for receiving said backing means.

13. The method according to claim 12 further comprising positioning said backing means in said pocket and covering said mold with said plate member after heating of said mold for a time sufficient to bond said backing means to said heat settable material.

14. The method according to claim 1 wherein said heat settable material is plastisol.

15. The method according to claim 1 wherein said backing means includes a hard or stiff layer and an adhesive layer on one side of said hard or stiff layer.

16. The method according to claim 15 further comprising applying a chemical barrier to said hard or stiff layer to enhance bonding with said heat settable material.

* * * * *